United States Patent [19]
Brueckner

[11] 4,031,499
[45] June 21, 1977

[54] THERMISTOR DEVICE

[75] Inventor: Wolfgang Brueckner, Deutschlandsberg, Austria

[73] Assignee: Siemens Aktiengesellschaft, Berlin & Munich, Germany

[22] Filed: June 30, 1975

[21] Appl. No.: 591,890

[30] Foreign Application Priority Data

July 9, 1974 Germany .......................... 2433000

[52] U.S. Cl. ................................ 338/23; 338/22 R
[51] Int. Cl.² ..................... H01C 7/00; H01C 7/02
[58] Field of Search ..................... 338/22, 23, 25; 317/157.5; 335/284; 315/8

[56] References Cited
UNITED STATES PATENTS

| | | | |
|---|---|---|---|
| 3,619,703 | 11/1971 | Yamashita et al. | 317/157.5 X |
| 3,845,442 | 10/1974 | Ihayg et al. | 338/23 |

*Primary Examiner*—C. L. Albritton
*Attorney, Agent, or Firm*—Hill, Gross, Simpson, Van Santen, Steadman, Chiari & Simpson

[57] ABSTRACT

A thermistor arrangement for the demagnetization of color television picture tubes having a continuous coating or layer at one side thereof which is maintained at a given potential and having two coatings or layers on the other side which are spaced by a width which approximately corresponds to the thickness of the thermistor. The thermistor is connected in a circuit arrangement so that it is divided into first and second zones with one of the zones acting as a heater for the other zone which acts as a switch for the demagnetization coil. The tube conductive coatings or layers which are spaced by a slot may be arranged in various patterns to produce given desired characteristics.

7 Claims, 7 Drawing Figures

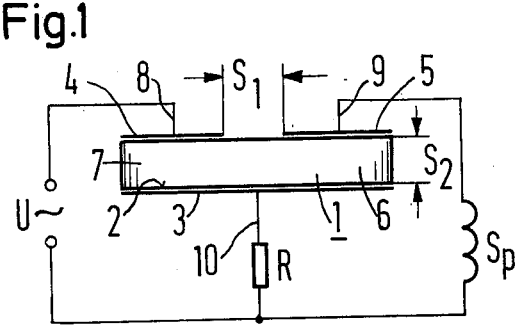
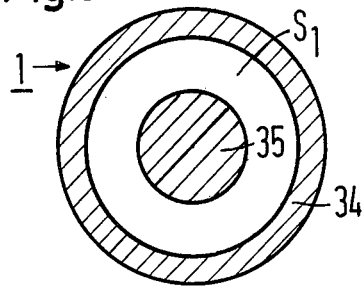
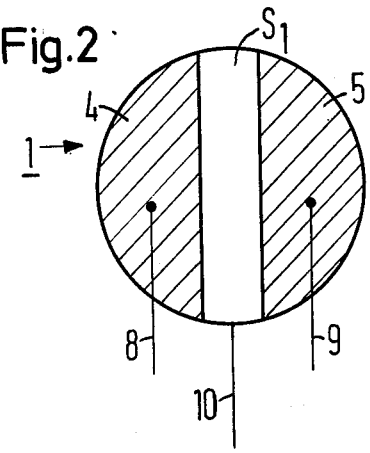
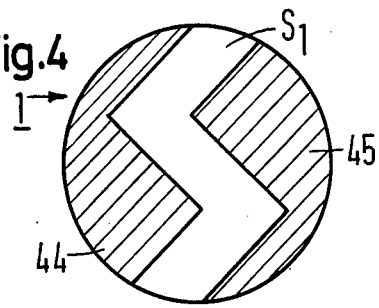
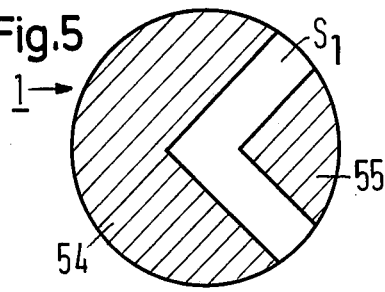
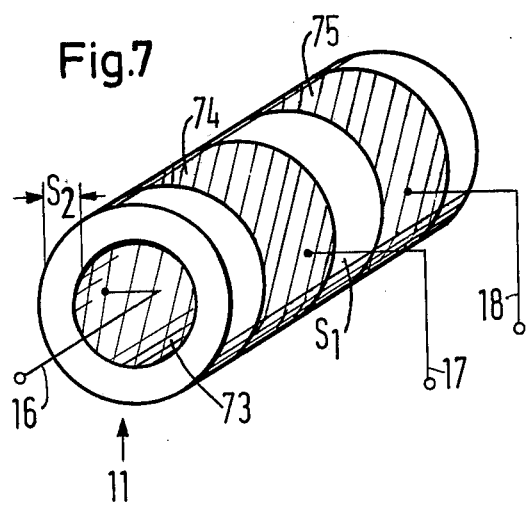
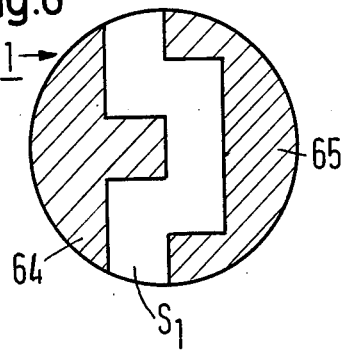

THERMISTOR DEVICE

BACKGROUND OF THE INVENTION

1. Field of the Invention

The field of art to which this invention pertains is thermistors and in particular to thermistor circuit arrangements which are used for the demagnetization of color television picture tubes.

2. Description of the Prior Art

Automatic demagnetization circuits are known in which a PTC-thermistor arranged in series with the demagnetization coil is used to continuously lower the magnetic field. To still further reduce the current flowing through the demagnetization coil without interrupting the heating of the PTC-thermistor, a voltage dependent resistor is connected in series with the demagnetization coil and the PTC-thermistor is supplied with the heating power additionally via a fixed resistance. It is also already known to use a PTC-thermistor heated by an alien source to reduce the demagnetization current. For this purpose the ceramic PTC-thermistor element is inserted in a tube with a heating coil applied to the exterior. A disadvantage of this measure is that the power required for the additional heating is relatively high and remains constant during the entire period during which the television receiver is on.

In addition, combinations of two thermally coupled PTC-thermistors are already known, in which case two PTC-thermistor plates are connected to one another with the aid of a heat-conducting but electrically insulating material. This PTC-thermistor combination is used to limit short circuiting currents in the heating circuit of electron tubes.

In addition, the German OS No. 2,107,365 discloses a PTC-thermistor combination which consists of two thermally close-coupled ceramic PTC-thermistor elements, in which a first PTC-thermistor element is close-coupled to a second PTC-thermistor element via the intermediary of a large-area central electrode which is highly conductive both thermally and electrically, and wherein the PTC-thermistor elements are contacted on the surfaces lying opposite the central electrode.

SUMMARY OF THE INVENTION

It is an important feature of the present invention to provide an improved arrangement for producing demagnetization of color television picture tubes.

It is another feature of the present invention to provide a novel thermistor for use in demagnetization circuits of the type described above.

It is also an object of the present invention to provide a thermistor having a continuous conductive coating or layer on one side and two separate conductive coatings at the opposite side thereof wherein said two conductive coatings or layers are spaced by a given distance from each other.

It is another feature of the present invention to provide a thermistor as described above wherein the spacing between the above-mentioned two coatings or layers is approximately equal to the width or thickness of the thermistor.

It is also an object of the present invention to provide a thermistor as described above wherein the two coatings or layers are in the form of semicircular coatings or layers and the thermistor itself is disc-shaped.

It is also an object of the present invention to provide a thermistor as described above wherein the two coatings or layers are in the form of concentrically applied coatings or layers.

It is also a feature of the present invention to provide a thermistor of the type above wherein the two coatings or layers are arranged in such a form as to provide a zig-zag-shaped gap therebetween.

It is another feature of the present invention to provide a thermistor of the type described above wherein the coatings or layers are arranged in such a manner as to provide a meander-shaped gap therebetween.

It is also an object of the present invention to provide a thermistor of the type described above which is tube-shaped and which has coatings or layers which are spaced apart by a distance which is approximately equal to the thickness of the wall of the thermistor.

These and other features, objects and advantages of the present invention will be understood from the following description and the associated drawing wherein reference numerals are utilized to designate a preferred embodiment.

BRIEF DESCRIPTION OF THE DRAWING

FIG. 1 is a demagnetization circuit showing the positioning of the coatings or layers, the external resistor and the demagnetization coil.

FIGS. 2, 3, 4, 5, and 6 are different arrangements for the coatings or layers on a disc-shaped thermistor according to the present invention.

FIG. 7 is a thermistor according to the present invention in the form of a tube with the coatings or layers being arranged on the outside of the tube and being spaced by a distance approximately equal to the wall thickness of the tube.

DESCRIPTION OF THE PREFERRED EMBODIMENTS

The invention relates to a PTC-thermistor for the demagnetization of color television picture tubes.

It is known to install a perforated or slotted mask of ferromagnetic material in the picture tubes of color television receivers. In order to avoid color impurities due to magnetic remanence, this mask must be regularly demagnetized. Such a demagnetization process requires an initially powerful magnetic alternating field which then gradually decreases to a very small residual value. This demagnetization process should take place automatically each time the television receiver is switched on.

A common feature of all the known demagnetization circuits is that they are relatively expensive in construction.

The aim of the present invention is to provide a PTC-thermistor which is inexpensive to produce for the magnetization of color television picture tubes.

This aim is realized in accordance with the invention by a PTC-thermistor which on one side thereof, there is a coating or layer which carries the same potential and on the other side, two coatings or layers separated from one another by a slot having a width, $S_1$.

NTC-thermistors and PTC-thermistors are known consisting of a tablet-shaped resistance body and provided on one side with a continuous coating or layer and on the other side with two coatings or layers which are separate from one another. However, the known NTC-thermistor and PTC-thermistor only have connection electrodes on the separate coatings or layers, the terminals pointing to one side. The width of the slot determines the resistance value of the NTC- and PTC-thermistors.

The German OS No. 2,235,783 discloses a varistor which on one side of the metal oxide body possesses a continuous coating or layer and on the opposite side possesses two separate coatings or layers. The known varistor in which the width Y between the separate coatings is smaller than the width $X_2$ of the varistor body is used in the circuit of a controlled silicon rectifier.

The advantages of the present invention will be explained in detail making reference to the drawing in which FIG. 1 shows a demagnetization circuit and FIGS. 2 to 7 show embodiments of the PTC-thermistor employed in accordance with the invention.

FIG. 1 represents a demagnetization circuit for the perforated or slotted mask of a color television picture tube. The PTC-thermistor body 1 is provided on its underneath 2 with a cohesive coating or layer 3. On the upper side of the PTC-thermistor body 1 are arranged two coatings or layers 4, 5 which are separate from one another, the slot width $S_1$ between the coatings or layers 4 and 5 corresponding approximately to the thickness $S_2$ of the PTC-thermistor body 1. The outer electrodes 10, 8 and 9 are arranged on the coatings or layers 3, 4 and 5.

One polarity of the main a.c. voltage supply is connected to one of the separate coatings 4; the other polarity is connected to the coating or layer 3 located on the other side of the PTC-thermistor body 1 through a series resistor R whose value is approximately one power of ten greater than the resistance of the demagnetization coil $S_P$. The second of the separate coatings or layers 5 is connected to one end of the demagnetization coil $S_P$ whose other end is directly connected to the polarity of the main a.c. supply voltage which is connected through the series resistor R to the coating or layer 3.

On the application of the full voltage, firstly a strong current flows through the demagnetization coil $S_P$. With increasing heating of the PTC-thermistor body 1, this current is reduced to an insignificant value. The current required to maintain the nominal temperature is supplied through the series resistor R. In this case, the zone 7 of the PTC-thermistor body 1, located between the coatings or layers 4 and 3, acts as a "heater" for the zone 6 which, in turn, acts as "switch" in the demagnetization circuit between the coatings or layers 5 and 3.

The PTC-thermistor body can be in the form of a resistance body consisting of barium titanate of Perowskite structure which is rendered semiconducting (n-conducting) by doping with suitable alien-lattice ions. The coatings or layers 3, 4, and 5 can be applied in a known manner to provide ohmic connections to the PTC-thermistor body 1.

It is possible to replace the coating or layer 3 which carries the same potential by two separate and short-circuited coatings or layers.

FIG. 2 shows a plan view of the PTC-thermistor body 1 which possesses two semicircular coatings or layers 4 and 5 which are separate from one another. Terminal electrodes 8, 9 are arranged on the coatings or layers. The terminal electrode 10 is arranged on the continuous coating or layer which is arranged on the rear and is not visible in the Figure.

FIG. 3 shows a plan view of a PTC-thermistor body 1 which possesses two concentrically applied coatings or layers 34, 35 which are separated from one another by a circular slot of the width $S_1$.

FIG. 4 shows a plan view of a PTC-thermistor body 1 which possesses two coatings or layers 44, 45 which are separated from one another by a zig-zag-shaped slot having the width $S_1$.

FIG. 5 shows a plan view of a PTC-thermistor body 1 which possesses two coatings or layers 54, 55 which are separated from one another by an angular slot having a width $S_1$.

FIG. 6 shows a plan view of a PTC-thermistor body 1 which possesses two coatings or layers 64, 65 which are separated from one another by a meander-shaped slot having a width $S_1$.

The embodiments of the coatings or layers shown in FIGS. 4 to 6 ensure a better heating of the PTC-thermistor zone which acts as switch by the zone which acts as heater.

In the embodiments shown in FIGS. 3 to 6 slot width $S_1$ is again contrived to be such that it corresponds approximately to the tablet width. This is advantageous because it is thus possible to achieve the smallest possible residual current values. If the two separate coatings or layers are approximately equal-sized in surface, the highest starting currents are obtained.

FIG. 7 shows a tube-shaped PTC-thermistor body 11 which on its inside is provided with a continuous coating 73 to which an outer electrode 16 is secured. On the outside are arranged two separate coatings or layers 74, 75 which the outer electrodes 17, 18 are applied. The slot width $S_1$ between the outer coatings or layers corresponds approximately to the wall thickness $S_2$ of the tube-shaped PTC-thermistor body 11.

The PTC-thermistors can be provided with a casing of an insulating material which for example can be produced in known manner by submerging the PTC-thermistor into a suitable synthetic (epoxide, resin, phenol resin and the like).

In an exemplary embodiment a PTC-thermistor as shown in FIG. 2 was used which had a diameter of 16 mm and a thickness of 4 mm. The slot width $S_1$ likewise amounted to 4 mm. The cold resistance value, measured between the coatings 4 and 3, 5 and 3, amounted to 30Ω, the resistance of the demagnetization coil $S_P$ amounted to 24Ω and the resistance R was 270Ω. This combination produced a peak starting current of approximately 5A which had fallen to a peak residual current of less than 2mA after approximately 120 seconds.

Viewed overall the PTC-thermistor in accordance with the invention is characterized in that the demagnetization of color television picture tubes can be effected substantially more cheaply than was previously the case as only on PTC-thermistor is used in place of two, and it is also possible to dispense with the housing and the required installation into the housing. It is thus possible to effect a very cheap mass production without impairing the mode of operation.

I claim as my invention:

1. A thermistor device comprising:
   a PTC thermistor body having first and second surfaces and a given body thickness therebetween,
   a continuous conductive layer on said first surface of said thermistor body,
   two conductive layers on the said second surface of said thermistor body and spaced from said continuous layer by said given thickness, each of said two conductive layers being spaced apart on said second surface by a predetermined interval, said predetermined interval being substantially the same as said given body thickness, and said thermistor having three terminals, one for each of said conductive layers.

2. A thermistor in accordance with claim 1 wherein the thermistor body is disc-shaped and wherein the two conductive layers on the second surface are in the shape of semi-circular layers.

3. A thermistor in accordance with claim 1 wherein the thermistor body is disc-shaped and wherein the two layers applied to the second surface thereof are in the form of concentrically-shaped layers.

4. A thermistor in accordance with claim 1 wherein the thermistor body is disc-shaped and wherein the two layers applied to the second surface are formed in such a manner as to be separated by a zig-zag-shaped interval.

5. A thermistor in accordance with claim 1 wherein the thermistor body is disc-shaped and wherein the two layers on the second surface are spaced from each other by an interval which is meander-shaped.

6. A thermistor in accordance with claim 1 wherein the thermistor body is tube-shaped and wherein the first surface comprises the inside surface of the tube and carries the said continuous conductive layer and the second surface comprises the outside surface of the tube carrying said two conductive layers.

7. A thermistor in accordance with claim 1 wherein the two layers which are disposed on the second surface have approximately the same surface area as each other.

* * * * *